United States Patent Office 2,993,024
Patented July 18, 1961

2,993,024
PROCESS FOR COLORING SPINNING OR LIKE COMPOSITIONS FOR PRODUCING SHAPED STRUCTURES
Hans Altermatt, Basel, Switzerland, assignor to Ciba Limited, Basel, Switzerland
No Drawing. Filed Dec. 22, 1958, Ser. No. 781,888
Claims priority, application Switzerland Dec. 24, 1957
7 Claims. (Cl. 260—37)

The coloring of high melting organic spinning masses, for example, of superpolyamides or polyethylene terephthalates, requires coloring matter of such high thermal stability that hitherto inorganic pigments have mainly been used for this purpose. However, inorganic pigments have a low coloring strength and the colored fibers produced therewith have rather cloudy tints. Attempts have therefore been made to replace inorganic pigments by organic pigments. However, only very few organic dyestuffs are known, for example, copper phthalocyanine and the chlorinated copper phthalocyanines, which do not decompose at the melting temperature of such spinning masses.

The present invention is based on the observation that dyestuffs of the general formula (1)

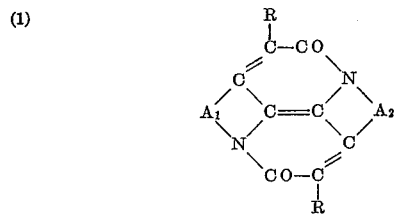

or (2)

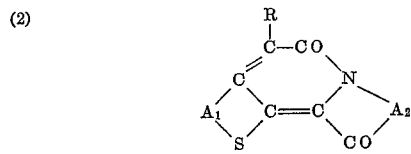

in which $A_1$ and $A_2$ represent arylene radicals free from groups imparting solubility in water, and R represents an aryl radical free from groups imparting solubility in water, are excellently suited for coloring spinning compositions of all kinds, for example, viscose, cellulose ester, superpolyamide, polyacrylonitrile or polyethylene terephthalate spinning compositions.

In the above formulae $A_1$, $A_2$ and R are advantageously arylene or aryl radicals of the benzene or naphthalene series. These radicals may contain substituents, for example, halogen atoms, especially chlorine or bromine atoms, or alkyl groups, especially methyl groups, alkoxy groups, aryl radicals especially benzene radicals, nitro groups or acylamino groups.

The dyestuffs of the Formula 1 can be obtained by the process described in U.S. Patent No. 1,043,682, granted November 5, 1912, to Gadient Engi, by condensing indigo or a substitution product thereof such, for example, as di-, tetra- or hexa-chloro- or -bromo-indigo, 7:7-dimethyl-indigo or naphthindigo, with an arylacetic acid halide, for example, phenylacetyl chloride or a substitution product thereof substituted in the benzene nucleus, for example, by a halogen atom or alkoxy, nitro or acylamino group, or α- or β-naphthylacetyl chloride or pyrenylacetyl chloride. The simplest member of this group of dyestuffs is the dyestuff of the formula (3)

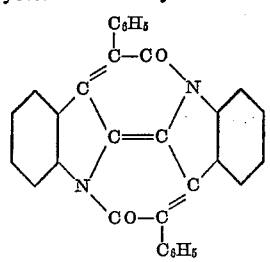

which is known in commerce as Ciba Lake Red B.

The dyestuffs of the Formula 2 can be obtained by the process described in French Patent No. 17,427, granted June 21, 1913, to Sociétá pour l'Industrie Chimique, Basel, Switzerland, by condensing a 2-thionaphthalene-2-indole-indigo which may be substituted by a halogen atom or alkoxy or alkyl group, with an arylacetic acid halide of the kind referred to above.

The material to be colored is advantageously mixed mechanically in the form of powder, granules or chippings with the dried dyestuff powder in such manner that the surface of the particles of the material become coated with a layer of the dyestuff. The dyestuff is advantageously used in a finely dispersed form such as is obtained, for example, by precipitating the crude dyestuff from sulfuric acid or grinding the crude dyestuff with an organic solvent. The particles of the artificial plastic so coated are then melted and spun in known manner or subjected to some other shaping operation, for example, to produce foils.

In the process of this invention the dyestuffs can also be used for coloring organic substances of high molecular weight, for example, cellulose esters or viscose which are spun with the use of a solvent. In the case of viscose the dyestuff pigment is advantageously added in the form of a fine aqueous dispersion to the viscous spinning composition.

The colorings obtained are distinguished by their high purity and good fastness to light.

The following example illustrates the invention, the parts being by weight:

Example 1

99 parts of a polyamide from hexamethylene diamine and adipic acid in the form of chippings are dry coated by mechanical mixing with 1 part of the dyestuff of the formula

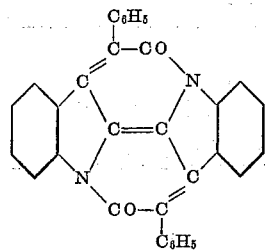

in a very finely divided form. The coated chippings are spun in the usual manner, for example, by the grid spinning method, at about 290–295° C. The thread so obtained has a brilliant red color, and the coloration has good properties of fastness.

In the following table are given in column I further dyestuffs which can be used for coloring the polyamide of hexamethylene diamine and adipic acid the tints given in column II. In column III is given the literature reference in which the preparation of the dyestuff is described:

| | I | II | III |
|---|---|---|---|
| 1 | | pure scarlet | U.S. Patent No. 1,043,682. |
| 2 | | orange | French Patent No. 17,427. |
| 3 | | violet | U.S. Patent No. 1,043,682. |

What is claimed is:
1. A process for coloring polyamide spinning composition which comprises incorporating in the composition a member selected from the group consisting of dyestuff of the formulae

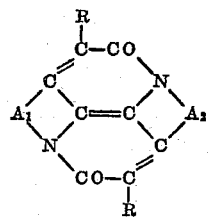

and

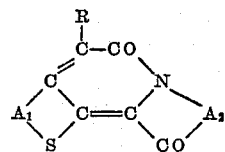

in which $A_1$ and $A_2$ represent benzene radicals free from groups imparting solubility in water, and R represents a member selected from the group consisting of phenyl and naphthyl radicals free from groups imparting solubility in water.

2. Fibers and shaped structures produced by the process claimed in claim 1.

3. A process for coloring polyamide spinning composition which comprises incorporating in the composition a dyestuff of the formula

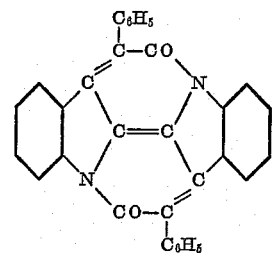

4. A process for coloring polyamide spinning composition which comprises incorporating in the composition a dyestuff of the formula

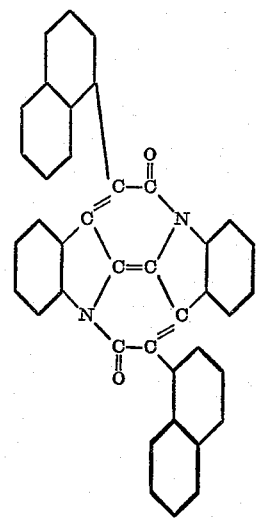

5. A process for coloring polyamide spinning composition which comprises incorporating in the composition a dyestuff of the formula

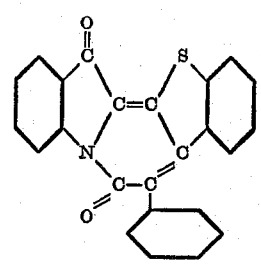

6. A process for coloring polyamide spinning composition which comprises incorporating in the composition a dyestuff of the formula

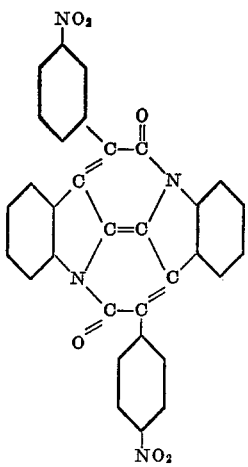

7. The combination of (a) a polyamide spinning composition and (b) a member selected from the group consisting of dyestuff of the formulae

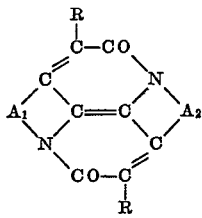

and

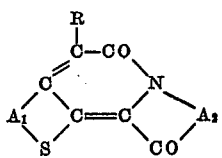

in which $A_1$ and $A_2$ represent benzene radicals free from groups imparting solubility in water, and R represents a member selected from the group consisting of phenyl and naphthyl radicals free from groups imparting solubility in water.

References Cited in the file of this patent

UNITED STATES PATENTS

| | | |
|---|---|---|
| 1,043,682 | Engi | Nov. 5, 1912 |
| 2,289,774 | Graves | July 14, 1942 |
| 2,383,995 | Stanley et al. | Sept. 4, 1945 |
| 2,701,211 | Taylor et al. | Feb. 1, 1955 |
| 2,739,153 | Williams | Mar. 20, 1956 |
| 2,850,520 | Merian et al. | Sept. 2, 1958 |